United States Patent
Rossi

(10) Patent No.: US 9,850,051 B2
(45) Date of Patent: Dec. 26, 2017

(54) STRENGTHENED BLISTER PACK

(75) Inventor: Massimiliano Rossi, Villamontagna (IT)

(73) Assignee: E-PHARMA TRENTO S.p.A., Frazione Ravina (IT)

( * ) Notice: Subject to any disclaimer, the term of this patent is extended or adjusted under 35 U.S.C. 154(b) by 1486 days.

(21) Appl. No.: 13/014,273

(22) Filed: Jan. 26, 2011

(65) Prior Publication Data
US 2011/0192759 A1   Aug. 11, 2011

(30) Foreign Application Priority Data
Feb. 10, 2010   (EP) .................... 10425027

(51) Int. Cl.
| | |
|---|---|
| A61J 1/03 | (2006.01) |
| B65B 47/00 | (2006.01) |
| B65B 51/10 | (2006.01) |
| B65B 5/02 | (2006.01) |
| B65D 75/32 | (2006.01) |
| B29C 51/08 | (2006.01) |
| B29L 31/00 | (2006.01) |

(52) U.S. Cl.
CPC ............ *B65D 75/327* (2013.01); *A61J 1/035* (2013.01); *B29C 51/082* (2013.01); *B29L 2031/7164* (2013.01); *B65D 2575/366* (2013.01)

(58) Field of Classification Search
CPC .... B65D 75/327; B65D 75/325; B65D 75/36; B65D 2575/366; A61J 1/035; B29C 51/082; B29L 2031/7164
USPC ................ 206/531, 538, 528, 532
See application file for complete search history.

(56) References Cited

U.S. PATENT DOCUMENTS

| | | | | |
|---|---|---|---|---|
| 3,924,746 | A * | 12/1975 | Haines .................... | 206/530 |
| 4,694,960 | A | 9/1987 | Phipps et al. | |
| 5,019,125 | A * | 5/1991 | Rebne et al. ........... | 206/531 |
| 5,236,749 | A * | 8/1993 | Ewing .................... | 428/35.2 |
| 5,360,116 | A * | 11/1994 | Schmiletzky ............ | 206/531 |
| 6,679,382 | B1 * | 1/2004 | Kancsar et al. ......... | 206/531 |
| 7,401,702 | B2 * | 7/2008 | Hession .................. | 206/531 |
| 7,828,149 | B2 * | 11/2010 | Kalvelage et al. ....... | 206/538 |
| 7,854,225 | B2 * | 12/2010 | Pasbrig et al. .......... | 206/531 |
| 2003/0203141 | A1 | 10/2003 | Blum et al. | |
| 2005/0077202 | A1 * | 4/2005 | Blum et al. ............. | 206/528 |
| 2008/0302695 | A1 | 12/2008 | Meeren et al. | |
| 2009/0057183 | A1 | 3/2009 | Benavides | |

FOREIGN PATENT DOCUMENTS

| | | |
|---|---|---|
| EP | 0 757 703 B1 | 8/1999 |
| EP | 0 627 906 B1 | 5/2000 |
| EP | 0 868 366 B1 | 4/2002 |
| EP | 1 173 362 B1 | 12/2008 |
| WO | WO 03/091019 A1 | 11/2003 |
| WO | WO 2004/041672 A2 | 5/2004 |
| WO | WO 2004/041672 A3 | 5/2004 |

OTHER PUBLICATIONS

European Preliminary Search Report dated Aug. 19, 2010, in EP 10425027, filed Feb. 10, 2010.

* cited by examiner

*Primary Examiner* — Andrew Perreault
(74) *Attorney, Agent, or Firm* — Oblon, McClelland, Maier & Neustadt, L.L.P.

(57) ABSTRACT

This invention relates to a strengthened blister pack for the packaging of solid pharmaceutical forms and/or food supplements, in particular solid pharmaceutical forms and/or food supplements that are not very hard and are highly friable.

21 Claims, 3 Drawing Sheets

Figure 4:
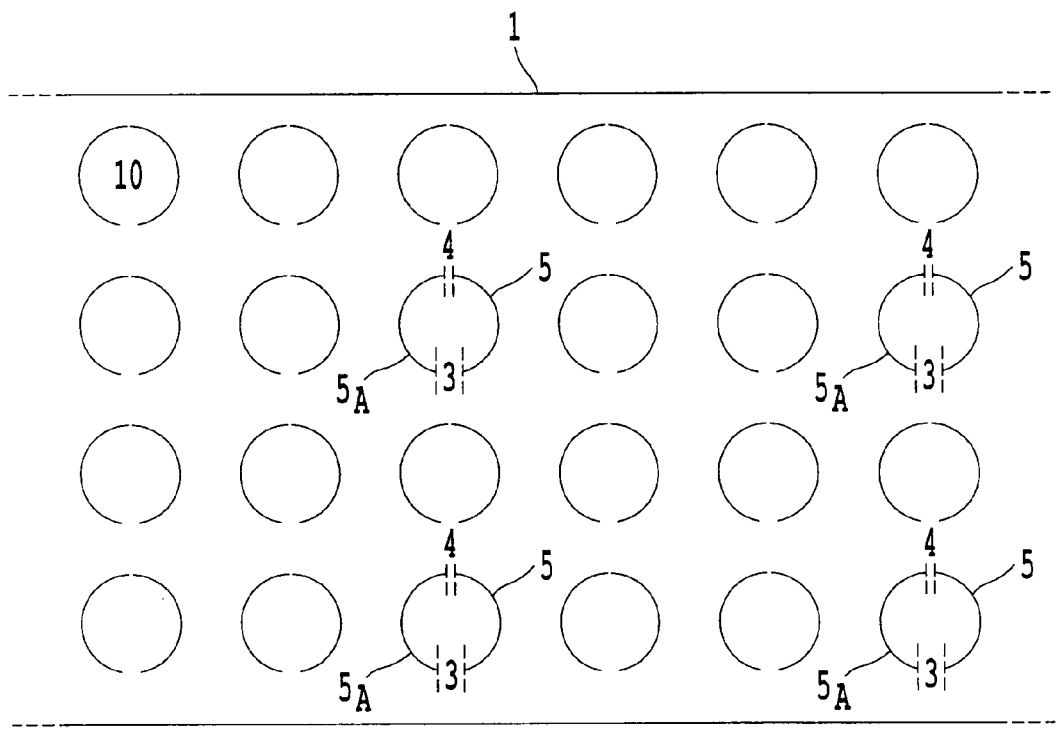

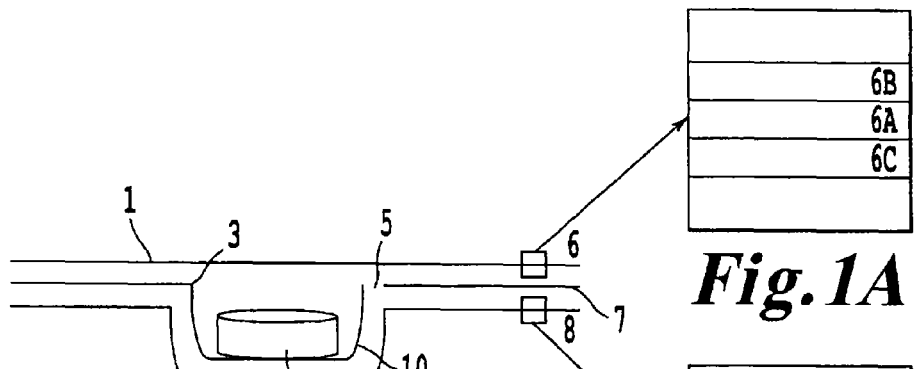
*Fig.1*
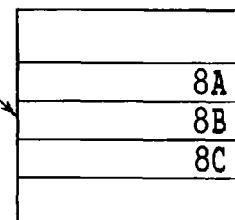
*Fig.1A*
*Fig.1B*
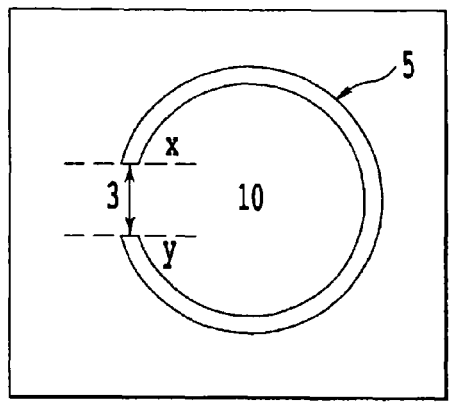
*Fig. 2*
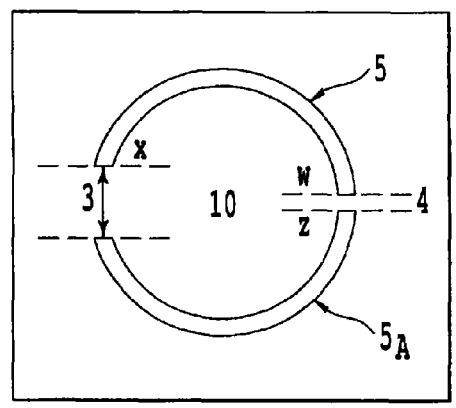
*Fig.2A*
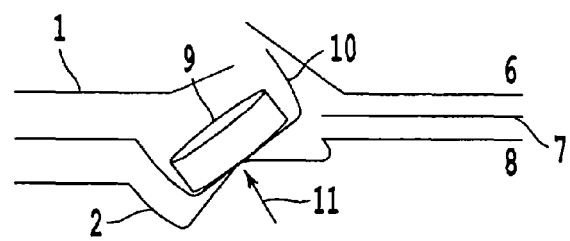
*Fig.3*

STRENGTHENED BLISTER PACK

FIELD OF THE INVENTION

This invention relates to a strengthened blister pack for the packaging of solid pharmaceutical forms and/or food supplements.

More particularly this invention relates to a new blister pack for the packaging of solid pharmaceutical forms and/or food supplements that are not very hard and are highly friable.

STATE OF THE ART

The use of blister packs for the packaging of solid pharmaceutical forms has been known for a long time.

Blister packs are in direct contact with the pharmaceutical form and are described as being the primary container. The blister packs are in turn placed in another container of larger size, known as the secondary container, whose function is to enclose one or more primary containers, together with the package insert, where provided.

In general, blister packs are formed from two superimposed sheets. The first comprises a thermoformed sheet, generally of plastics, characterized by the presence of blisters, each of which is of dimensions to contain a single dose unit (for example a single tablet or capsule). The open upper side of these blisters is hermetically sealed by superimposing a second sheet comprising at least one layer of aluminium over the said plastics sheet of dimensions such as to cover all the blisters, attached to said plastics sheet through an adhesive layer or by welding. Said second sheet comprises an effective barrier against moisture and oxygen, and therefore makes it possible to avoid or decrease deterioration of the pharmaceutical form throughout its storage life until its expiry date. At the same time, said aluminium layer is of a thickness such that it can be easily broken and permit expulsion of the contents when pressure is applied to each single blister.

The thermoformed plastics sheet may be further coated on the underside with a second sheet comprising aluminium, which further reduces the ingress of moisture and oxygen into the blisters.

As an alternative, packages comprising two sheets of aluminium welded together to form envelopes in which the pharmaceutical form is inserted prior to welding have been introduced. In this case, the contents are expelled by tearing the envelope.

Over the years many patents have been filed in respect of different blister pack characteristics.

As far as the shape of blister packs is concerned, for example, U.S. patent application US 2008/0302695 relates to a foldable blister pack in which the blisters are separated by "cutting" lines which make it possible to reduce the space occupied by the blister pack within the secondary container.

With regard to processes for the industrial manufacture of blister packs, for example, European patent EP 1 173 362 relates to a method for joining the sheets forming a blister pack through the use of a laser welding technique.

More recently, patents filed have related to the use of new polymer materials, which make it possible to improve the preservation of the pharmaceutical forms within the blister packs. For example, European patent EP 0 757 703 relates to an aluminium-free sheet, which is useful for sealing blisters, comprising a matrix of, for example, highly crystalline polypropylene, containing a particulate filler which can be used to replace the aluminium sheets. International patent WO 03/091019 instead relates to a multilayer blister pack in which one layer of fluoride polymer provides greater impermeability to moisture and oxygen.

In general, the dimensions and weight of blister packs are such that patients can easily carry them with them, for example in a pocket or handbag. A first disadvantage lies in the fact that the individual blisters can be accidentally opened when the blister pack is transported without the secondary packaging.

One possible solution has been suggested in patent EP 0 627 906 which relates to a blister pack in which deliberate removal of the pharmaceutical form is only possible when the blister pack is in an open configuration. Conversely, when the blister pack is in the closed configuration the aluminium sheet is protected from contact with other hard and/or sharp objects, which may cause it to tear.

A second disadvantage lies in the fact that whenever the contents of the blister pack comprise a tablet, it is not infrequent that the pharmaceutical form breaks up when expelled. For example it is known that orally dispersible (OD) tablets are more fragile than normal swallowable tablets and must therefore be packed using special systems, for example in peelable blister packs. Peelable blister packs are a special type of blister pack in which the solid pharmaceutical form is removed by lifting the aluminium sheet sealing off each individual blister by means of a tongue, thus avoiding subjecting the pharmaceutical form to mechanical stress. Peelable blister packs ensure that tablets remain intact, but it is nevertheless possible that users used to expulsion blister packs will commit errors when opening them. This may give rise to damage to the tablets or their break-up with a consequent risk of incorrect administration or accidental ingestion of parts of the packaging.

A further disadvantage lies in the fact that persons with weak or deformed hands have difficulty in opening conventional and/or peelable blister packs. The presence of a single sheet of flexible plastics does not in fact encourage the application of force to individual blisters.

In this respect, patent EP 0 868 366 provides a blister pack with a rigid reinforcing layer which allows easy compression by people with weak or deformed hands. The reinforcing layer is preferably adhesively bonded to the layer in deformable plastics material in such a way as to prevent separation of the two layers when pressure is applied. However, no reference is made in the description to the problem of the break-up of tablets during the expulsion phase.

SUMMARY OF THE INVENTION

The Applicant has developed a new blister pack, which is able to overcome the abovementioned disadvantages.

Firstly, the blister pack according to this invention makes it possible to keep tablets intact during the expulsion stage.

Secondly, the blister pack according to this invention makes it possible to expel the contents of a blister in a similar way to conventional blister packs.

Thirdly, the blister packs according to this invention provide greater protection for tablets from impact and accidental squashing during transport and storage.

Finally, the blister pack according to this invention has rigidity in the blisters such that it is simpler for people with weak or deformed hands to apply the necessary pressure to expel the contents of a blister in comparison with the situation for more flexible blisters.

This invention provides a blister pack characterized by a reinforcing system, which is obtained within each individual blister, such that the application of pressure to each individual blister produces partial expulsion of the reinforcing system itself.

In particular the said reinforcing system comprises a removable rigid capsule made in a first thermoformed layer of flexible polymer material. Said first thermoformed layer is covered on one side by at least one sealing sheet which closes off the blisters, and on the other side is covered by at least one shaped layer of polymer material which can be optionally coated with a further sheet of aluminium. The pressure applied to each individual blister formed in the shaped layer causes partial expulsion of the removable capsule from its original "resting" seat in the blister, with consequent breakage of the sealing sheet for the individual blister, thus making it possible to expel the pharmaceutical form without it suffering from the externally-applied pressure in any way.

DRAWINGS

FIG. 1: view in lateral cross-section of a blister in a blister pack comprising the reinforcing system according to this invention.

FIG. 1A: magnification of the lateral cross-section of upper layer 6 used according to this invention.

FIG. 1B: magnification of the lateral cross-section of shaped layer 8 used according to this invention.

FIG. 2: view from above of the reinforcing system according to this invention.

FIG. 2A: view from above of a preferred embodiment of the reinforcing system according to this invention.

FIG. 3: view in lateral cross-section of the behaviour of the reinforcing system according to this invention when subjected to pressure.

FIG. 4: view from above of an embodiment of a continuous sheet of blister packs according to this invention.

Figure 5:
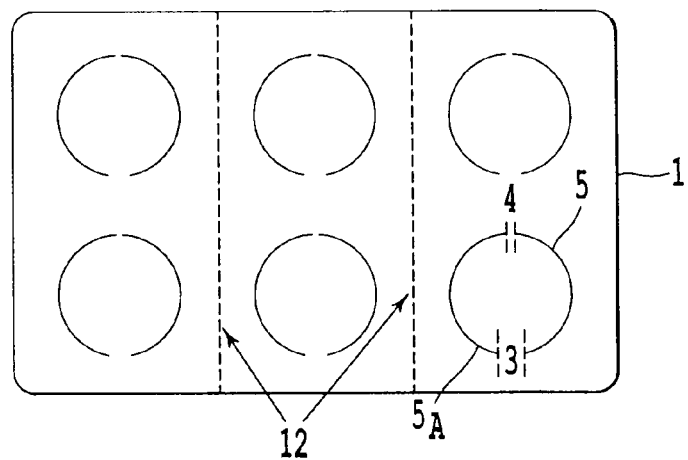

FIG. 5: view from above of an embodiment of a blister pack according to this invention.

Figure 6:
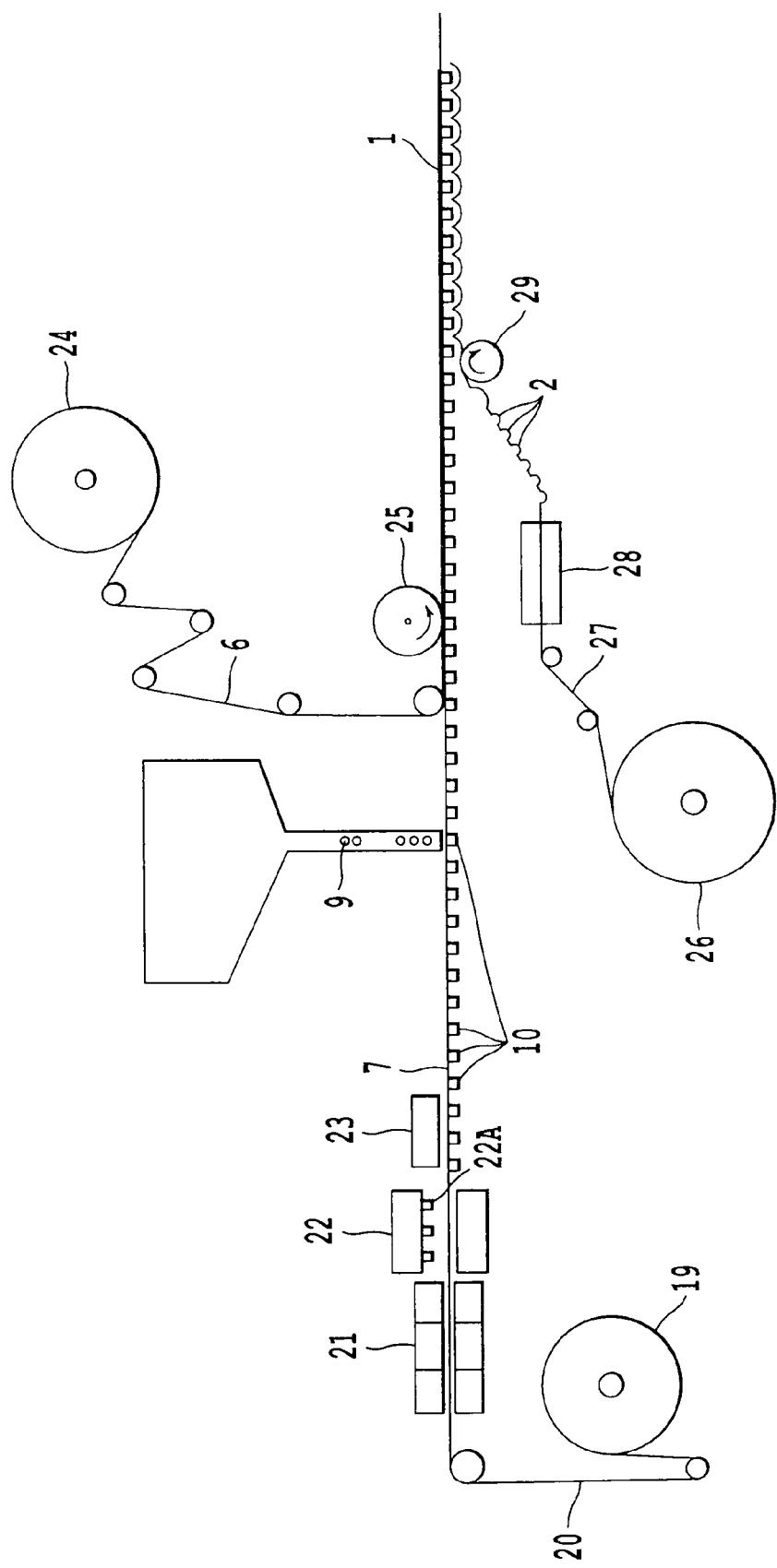

FIG. 6: schematic illustration of the system for the production of a blister pack according to this invention.

DETAILED DESCRIPTION OF THE INVENTION

A first aspect of this invention relates to a blister pack 1 comprising at least one thermoformed layer 7 in which a reinforcing system is provided. The said reinforcing system comprises a rigid removable capsule 10 produced by punching in a thermoformed layer 7.

The punching is carried out in such a way that removable capsule 10 maintains at least one area of continuity 3 with the thermoformed layer 7, said area of continuity 3 holding back said removable capsule 10 in its original "resting" sheet as shown in FIG. 1.

In particular, with reference to FIG. 1, said blister pack 1 comprises at least one thermoformed layer 7 comprising at least one removable capsule 10 which has at least one area of continuity 3 with said thermoformed layer 7 and at least one area of discontinuity 5 from the same thermoformed layer 7.

Said thermoformed layer 7 is sealed and covered on its top surface by at least one top layer 6, and is sealed and covered on its bottom surface by at least one shaped layer 8 in which blisters 2 are produced.

The terms "top" and "bottom" as used in the description and in the claims for this invention refer to the position of the blister pack as illustrated in FIG. 1.

The materials used to produce top layer 6, which seals and covers the top surface of thermoformed layer 7, and shaped layer 8, which seals and covers the bottom surface of thermoformed layer 7, are selected on the basis of the properties of the pharmaceutical form which has to be packed, in particular on the basis of the permeability of said materials to air and oxygen.

In particular, thermoformed layer 7, comprising polymer material, is between 0.2 mm and 0.6 mm thick, preferably of approximately 0.4 mm, and is transparent or opaque, impermeable and flexible.

Suitable polymer materials according to this invention are polyvinyl chloride (PVC), polyvinylidene chloride (PVDC), polyacrylonitrile (PAN), polychlorotrifluoroethylene (PCTFE, for example Aclar®), polyethylene (PE—either low or high density), polyethylene terephthalate (PET), polyethylene naphthalate (PEN), polypropylene (PP), polystyrene, polyesters, polyamides (PA), or their copolymers.

Preferably, the polymer material is polyvinyl chloride (PVC).

Materials which may be used to produce said layers 6 and 8 according to this invention, which may be the same or different, are well known to those skilled in the art and are: polymer materials such as PVC, PVDC, PAN, PE, PET, PEN, PP, polyacrylate, cyclic olefins (COC, for example POLYBAR®), polystyrene, polyesters, polyamides (PA), ethylene vinyl alcohol (EVOH), polyvinyl alcohol (PVOH) or their copolymers; paper; or sheets of metal, such as aluminium or tin; or superimposed layers thereof.

In particular, top layer 6 comprises at least one aluminium layer $6_A$. Said aluminium layer $6_A$ is caused to adhere to the thermoformed layer 7 through an adhesive system or by welding.

Said aluminium layer $6_A$ is between 5 and 50 μm thick, preferably between 10 and 30 μm, and more preferably approximately 20 μm.

Preferably top layer 6 comprises at least three layers: an aluminium layer $6_A$, a top layer $6_B$ in contact with air, and a bottom layer $6_C$ in contact with the thermoformed layer 7, said layers $6_B$ and $6_C$ being located on opposite sides of said aluminium layer $6_A$.

In particular, said layer $6_B$ is between 5 and 50 μm thick, preferably between 20 and 30 μm, more preferably approximately 25 μm; and said layer $6_C$ is between 10 and 90 μm thick, preferably between 30 and 70 μm, more preferably approximately 60 μm.

Preferably, said layer $6_B$ is made of polyamide (PA) and said layer $6_C$ is made of polyvinyl chloride (PVC).

The thickness of top layer 6 which seals and covers the top surface of the blister pack is necessary to prevent accidental breakage in the event of the blister pack being transported in a pocket or bag, but does not adversely affect the stage of expelling the pharmaceutical form, given that it is removable capsule 10 and not pharmaceutical form 9 which causes breakage of said top layer 6.

In addition to this, thermoformed layer 7 is sealed and covered on the bottom surface by at least one shaped layer 8 in which blisters 2 are produced.

Said shaped layer 8 comprises at least one layer of polymer material $8_A$, of between 5 and 50 μm thick, preferably between 10 and 30 μm, more preferably approximately 20 μm, and is preferably made of polyamide (PA).

Preferably, said shaped layer 8 comprises at least a second layer $8_B$ provided in a position beneath said layer $8_A$ and therefore in contact with air. Said second layer $8_B$ is between 5 and 80 μm thick, preferably between 20 and 50 μm, more preferably approximately 40 μm, and is preferably made of aluminium.

Optionally said layer $8_B$ may be covered with a further paint layer $8_C$, located beneath said layer $8_B$.

The reinforcing system, according to this invention, comprises a rigid removable capsule 10 and is made in the thermoformed layer 7 by punching.

The punching stage is performed in such a way that the removable capsule 10 has at least one area of continuity 3 with thermoformed layer 7 and at least one area of discontinuity 5 from the same thermoformed layer 7 (FIG. 2). Said area of continuity 3 holds back the removable capsule 10 in its original "resting" seat in blister 2.

Preferably the punching stage is performed in such a way that removable capsule 10 has at least two areas of continuity 3, 4 with thermoformed layer 7 and at least two areas of discontinuity 5, $5_A$ from the same thermoformed layer 7 (FIG. 2A).

Said two areas of continuity 3, 4 have different dimensions. In this context the term "dimensions" indicates the distance between the ends x,y and/or w,z of areas of discontinuity 5, $5_A$, as illustrated in FIGS. 2 and 2A. In particular, as illustrated in FIG. 2A, the area of continuity 3 corresponds to the greatest distance between the x,y ends of areas of discontinuity 5, $5_A$ and the area of continuity 4 corresponds to the least distance between ends w,z of areas of discontinuity 5 and $5_A$.

Preferably, areas of continuity 3, 4 have dimensions such that their ratio is between 5:1 and 25:1, preferably between 5:1 and 15:1, and more preferably between approximately 8:1 and 10:1.

As illustrated in FIG. 3, removable capsule 10, which comprises the reinforcing system according to this invention, is made in such a way that external pressure 11 applied to a single blister 2 causes partial expulsion of removable capsule 10 from its original "resting" seat, with consequent breakage of top layer 6 which seals the top surface of corresponding blister 2, thus making it possible for pharmaceutical form 9 to be expelled without this in any way suffering from the applied external pressure 11.

A second aspect of this invention relates to the process for producing a blister pack 1 comprising a reinforcing system, which comprises a rigid removable capsule 10 formed in a thermoformed layer 7.

In particular, the process of producing said blister pack 1 according to this invention is characterized by a stage of punching a thermoformed layer 7, said punching stage being carried out on the top base of a capsule obtained by thermoforming a coil of suitable material to obtain said thermoformed layer 7.

Thus, with reference to FIG. 6, the process for the production of blister packs 1 according to this invention comprises the stages of:
(I) providing and unrolling a coil 19 of polymer sheet 20 to form thermoformed layer 7,
(II) heating said polymer sheet 20,
(III) producing said thermoformed layer 7 by thermoforming at least one capsule in said sheet 20,
(IV) punching at the top base of said at least one capsule to form at least one removable capsule 10 in said thermoformed layer 7.

In particular, coil 19 used in stage (I) to form said thermoformed layer 7 comprises polymer material between 0.2 mm and 0.6 mm thick, preferably of approximately 0.4 mm, which is transparent or opaque, impermeable and flexible.

Suitable polymer materials according to this invention are polyvinyl chloride (PVC), polyvinylidene chloride (PVDC), polyacrylonitrile (PAN), polychlorotrifluoroethylene (PCTFE, for example Aclar®), polyethylene (PE—either low or high density), polyethylene terephthalate (PET), polyethylene naphthalate (PEN), polypropylene (PP), polystyrene, polyesters, polyamides (PA), or their copolymers.

The polymer material is preferably PVC.

Preferably stage (II) of heating is carried out in three consecutive steps, by means of three adjacent plates 21, up to a temperature of 120°-140° C.

Preferably thermoforming stage (III) is carried out using a mould 22 fitted with shaped punches 22a.

Punching stage (IV) is carried out using a die cutting machine 23 in such a way that removable capsule 10 has at least one area of continuity 3 with said thermoformed layer 7 and at least one area of discontinuity 5 from said thermoformed layer 7 (FIG. 2). Said area of continuity 3 holds removable capsule 10 in its original "resting" seat in housing 2.

Preferably punching stage (IV) is carried out in such a way that removable capsule 10 has at least two areas of continuity 3, 4 with said thermoformed layer 7 and at least two areas of discontinuity 5, $5_A$ from said thermoformed layer 7 (FIG. 2A).

Said two areas of continuity 3, 4 have different dimensions. In this context the term "dimensions" indicates the distance between the x,y and/or w,z ends of areas of discontinuity 5, $5_A$ as illustrated in FIGS. 2 and 2A. In particular, as illustrated in FIG. 2A, the area of continuity 3 corresponds to the greatest distance between the x,y ends of areas of discontinuity 5, $5_A$ and the area of continuity 4 corresponds to the least distance between w,z ends of areas of discontinuity 5 and $5_A$.

The man skilled in the art will be aware that the dimensions of said areas of continuity 3, 4, areas of discontinuity 5, $5_A$, removable capsule 10 and blisters 2 are not always identical, but vary with the dimensions of the pharmaceutical form which has to be included.

Preferably, areas of continuity 3, 4 have dimensions such that their ratio is between 5:1 and 25:1, preferably between 5:1 and 15:1, and more preferably between approximately 8:1 and 10:1.

Again with reference to FIG. 6, the process for the production of blister pack 1 according to this invention preferably comprises the stages of:
(V) providing the pharmaceutical forms 9 to be included in blister pack 1,
(VI) positioning said pharmaceutical forms 9 in removable capsules 10,
(VII) providing and unrolling a coil 24 for the formation of top layer 6,
(VIII) welding said top layer 6 to cover and seal the top surface of said thermoformed layer 7,
(IX) providing and unrolling a coil 26 of sheet 27 to form shaped layer 8,
(X) forming said shaped layer 8 by forming at least one blister 2 in said sheet 27,
(XI) welding shaped layer 8 to cover and seal the bottom surface of said thermoformed layer 7.

When all the stages from (V) to (XI) have been performed, punching stage (IV) is carried out on thermoformed layer 7 obtained in stage (III), before stage (VIII) of welding top layer 6, preferably before stage (V) of providing the pharmaceutical forms 9 which have to be included in blister pack 1.

Preferably stage (VI) comprises a stage of checking that pharmaceutical forms 9 are present in removable capsules 10.

Preferably stage (VI) comprises a further stage of de-dusting the pharmaceutical forms.

Preferably, welding stage (VIII) is carried out by means of roller 25, mechanically at approximately 180° C. and applying a pressure of approximately 15 kg/cm$^2$. Alternatively, stage (VIII) can be carried out by chemical welding.

Preferably, coil 24 used in stage (VII) to form top layer 6 and coil 26 used in stage (IX) to form shaped layer 8 are formed in materials selected on the basis of the properties of the pharmaceutical form which has to be packed, in particular on the permeability of the said materials to air and oxygen.

Materials which may be used to form top layer 6 and shaped layer 8 according to this invention are well known to those skilled in the art and are: polymer materials such as PVC, PVDC, PAN, PE, PET, PEN, PP, polyacrylate, cyclic olefins (COC, for example POLYBAR®), polystyrene, polyesters, polyamides (PA), ethylene vinyl alcohol (EVOH), polyvinyl alcohol (PVOH) or their copolymers; paper; or sheets of metal such as aluminium or tin; or superimposed layers thereof.

In particular, top layer 6 comprises at least one aluminium layer $6_A$. Said aluminium layer $6_A$ is between 5 and 50 µm thick, preferably between 10 and 30 µm, or preferably approximately 20 µm.

Preferably, said top layer 6 comprises at least three layers: an aluminium layer $6_A$, a top layer $6_B$ in contact with air, and a bottom layer $6_C$ in contact with the thermoformed layer 7, said layers $6_B$ and $6_C$ being located on opposite sides in relation to said aluminium layer $6_A$.

In particular, said layer $6_B$ is between 5 and 50 µm thick, preferably between 20 and 30 µm, more preferably approximately 25 µm, and said layer $6_C$ is between 10 and 90 µm thick, preferably between 30 and 70 µm, more preferably approximately 60 µm.

Preferably, said layer $6_B$ is made of PA and said layer $6_C$ is made of PVC.

Preferably, shaped layer 8 comprises at least one layer of polymer material $8_A$. Said layer of polymer material $8_A$ is between 5 and 50 µm thick, preferably between 10 and 30 µm, more preferably approximately 20 µm, and is preferably made of PA.

Preferably, said shaped layer 8 comprises at least one second layer $8_B$ in a bottom position with respect to said layer $8_A$ and therefore in contact with air. Said second layer $8_B$ is between 5 and 80 µm thick, preferably between 20 and 50 µm, more preferably approximately 40 micron, and is preferably made of aluminium.

Optionally, a further paint layer $8_C$, provided below said layer $8_B$, may be present on said layer $8_B$.

Preferably, forming stage (X) is carried out cold using a mould 28, with Teflon-coated punches.

Preferably, welding stage (XI) is carried out using a roller 29 at approximately 210° C. and applying a pressure of approximately 20 kg/cm$^2$.

At the end of welding stage (XI) a continuous sheet of blisters 1 is obtained as illustrated in FIG. 4, comprising rows of removable capsules 10 and corresponding blisters 2.

In order to obtain separate blister packs 1, said continuous sheet is cut so as to obtain blister packs having the desired dimensions and comprising a predetermined desired number of blisters 2. Preferably said blister packs 1 comprise at least two blisters 2. Preferably said blister packs 1 comprise more than two blisters, preferably from four to twelve blisters.

FIG. 5 illustrates blister packs 1 comprising six removable capsules 10 located in two rows of three capsules. Optionally, further incisions 12 may be made in top layer 6 enabling patients to divide the blister packs into functional parts for transport in a pocket or a bag.

The invention claimed is:

1. A blister pack comprising at least a first thermoformed layer, a top layer, which seals and covers a top surface of said first thermoformed layer, and a shaped layer, which seals and covers a bottom surface of said blister pack, wherein said first thermoformed layer comprises a reinforcing system comprising a removable capsule that is removable from the first thermoformed layer.

2. The blister pack according to claim 1, in which said removable capsule has at least one area of continuity with said first thermoformed layer and at least one area of discontinuity with said first thermoformed layer.

3. The blister pack according to claim 2, in which said removable capsule has at least two areas of continuity with said first thermoformed layer and at least two areas of discontinuity from said first thermoformed layer.

4. The blister pack according to claim 3, in which said at least two areas of continuity have different dimensions.

5. The blister pack according to claim 3, in which said at least two areas of continuity have dimensions such that their ratio is between 5:1 and 25:1.

6. The blister pack according to claim 1, in which said first thermoformed layer is between 0.2 mm and 0.6 mm thick.

7. The blister pack according to claim 1, in which said first thermoformed layer comprises at least one polymer selected from the group consisting of: polyvinyl chloride, polyvinylidene chloride, polyacrylonitrile, polychlorotrifluoroethylene, polyethylene, polyethylene terephthalate, polyethylene-naphthalate, polypropylene, polystyrene, polyesters, polyamides, and their copolymers.

8. The blister pack according to claim 1, in which said top layer comprises at least one aluminium layer.

9. The blister pack according to claim 8, in which said aluminium layer is between 5 and 50 µm thick.

10. The blister pack according to claim 8, in which said top layer comprises at least a layer located above, and a layer located beneath, said aluminium layer.

11. The blister pack according to claim 10, in which each of said layer located above and said layer located beneath, which are the same or different, comprises a polymer selected from the group consisting of: polyvinyl chloride, polyvinylidene chloride, polypropylene, polyethylene terephthalate, polyacrylate, polyacrylonitrile, cyclic olefins, polystyrenes, polyesters, polyamides, ethylene vinyl alcohol, polyvinyl alcohol and their copolymers.

12. The blister pack according to claim 10, in which said layer located above said aluminium layer is between 5 and 50 µm thick.

13. The blister pack according to claim 10, in which said layer located beneath said aluminium layer is between 10 and 90 µm thick.

14. The blister pack according to claim 1, in which said shaped layer comprises at least one layer of polymer material.

15. The blister pack according to claim 14, in which said layer of polymer material is between 5 and 50 µm thick.

16. The blister pack according to claim 14, in which said layer of polymer material comprises a polymer selected from the group consisting of polyvinyl chloride, polyvinylidene chloride, polypropylene, polyethylene terephthalate, polyacrylate, polyacrylonitrile, cyclic olefins, polystyrenes, polyesters, polyamides, ethylene vinyl alcohol, polyvinyl alcohol and their copolymers.

17. The blister pack according to claim 14, in which said shaped layer comprises at least a second layer located beneath said layer.

18. The blister pack according to claim 17, in which said second layer comprises a layer of aluminium.

19. The blister pack according to claim 18, in which said aluminium layer is between 5 and 80 µm thick.

20. The blister pack according to claim 17, in which said second layer is covered with a paint layer.

21. The blister pack according to claim 1, wherein the removable capsule of the reinforcing system is rigid and the first thermoformed layer is otherwise flexible.

* * * * *